(12) United States Patent
Zhang et al.

(10) Patent No.: US 8,621,616 B2
(45) Date of Patent: Dec. 31, 2013

(54) METHOD AND SYSTEM FOR IDENTIFYING SUSPECTED PHISHING WEBSITES

(75) Inventors: Liming Zhang, Hangzhou (CN); Bo Wen, Hangzhou (CN); Yongwei Kong, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 419 days.

(21) Appl. No.: 12/661,753

(22) Filed: Mar. 22, 2010

(65) Prior Publication Data

US 2010/0251380 A1    Sep. 30, 2010

(30) Foreign Application Priority Data

Mar. 24, 2009    (CN) .......................... 2009 1 0129377

(51) Int. Cl.
*H04L 29/06*    (2006.01)

(52) U.S. Cl.
USPC .......................................................... 726/22

(58) Field of Classification Search
USPC .................. 726/2, 22–24; 713/188
See application file for complete search history.

(56) References Cited

U.S. PATENT DOCUMENTS

| | | | |
|---|---|---|---|
| 7,266,693 B1 | 9/2007 | Potter et al. | |
| 7,580,982 B2 | 8/2009 | Owen et al. | |
| 7,590,698 B1 | 9/2009 | Cooley | |
| 7,603,699 B2 | 10/2009 | Abdulhayoglu | |
| 7,634,810 B2 | 12/2009 | Goodman et al. | |
| 7,650,310 B2 | 1/2010 | Stefanescu | |
| 7,680,815 B2 | 3/2010 | Komine et al. | |
| 7,681,234 B2 | 3/2010 | Florencio et al. | |
| 7,769,820 B1* | 8/2010 | Spies et al. | 709/218 |
| 2004/0078422 A1 | 4/2004 | Toomey | |
| 2007/0033639 A1 | 2/2007 | Goodman et al. | |
| 2007/0083670 A1* | 4/2007 | Kelley et al. | 709/245 |
| 2008/0172738 A1* | 7/2008 | Bates et al. | 726/22 |
| 2008/0271141 A1 | 10/2008 | Goldman et al. | |
| 2009/0077383 A1 | 3/2009 | De Monseignat et al. | |
| 2009/0182818 A1* | 7/2009 | Krywaniuk | 709/206 |

FOREIGN PATENT DOCUMENTS

CN    101221611 A    7/2008
EP       1863240 A2   12/2007

* cited by examiner

*Primary Examiner* — Ali Abyaneh
(74) *Attorney, Agent, or Firm* — Van Pelt, Yi & James LLP

(57) ABSTRACT

Identifying suspected phishing websites includes: obtaining an address of a website to be identified; determining, according to the address of the website to be identified, that the website to be identified is neither a legal website to be protected nor a phishing website; applying a suspected phishing website rule by matching a regular expression with the address of the website to be identified; and in the event that the matching is successful, determining that the website to be identified is a suspected phishing website.

13 Claims, 4 Drawing Sheets

METHOD AND SYSTEM FOR IDENTIFYING SUSPECTED PHISHING WEBSITES

CROSS REFERENCE TO OTHER APPLICATIONS

This application claims priority to People's Republic of China Patent Application No. 200910129377.6 entitled METHOD AND SYSTEM FOR IDENTIFYING SUSPECTED PHISHING WEBSITES filed Mar. 24, 2009, which is incorporated herein by reference for all purposes.

FIELD OF THE INVENTION

The invention relates to the field of computer technologies, and in particular, to a method and system for identifying suspected phishing websites.

BACKGROUND OF THE INVENTION

As Internet commerce grows, some deceptive websites, by setting their website addresses to be very similar to those of other legitimate websites, deceive network users into giving over their personal information through a practice known as phishing.

As used herein, phishing website refers to a website that has a website address name very similar to that of a non-phishing business website address and aims to deceive users into giving over their personal information.

A list of phishing websites refers to a list containing the addresses of already identified phishing websites. The phishing websites in the list may be obtained from users who file complaints regarding various websites that practice phishing. The phishing websites in the list may also be obtained by manually screening for websites that practice phishing. In addition, the phishing websites addresses in the list are those that have already been identified to harm users through their phishing activities.

A list of websites to be protected contains the addresses of websites that need to be protected. Websites to be protected generally include those that are very popular in network transactions or electronic business. As a result, these websites are often the targets of imitation by phishing websites. Taobao, Alibaba, and Alipay are some examples of websites to be protected.

Existing identifying technologies provide for identifying websites that either need to be protected or are already known to be phishing websites by means of querying a database. Particularly, a website that needs to be protected and/or a phishing website may be identified by querying the list of websites to be protected and/or the list of phishing websites. Although already known phishing websites can be identified by using the existing identifying technologies, a defrauder may continue his/her scam by utilizing a new website address that is only a slight variation from the address of a previously identified phishing website. In addition, in existing technologies, the database is usually updated with new addresses of phishing websites only upon receiving a report of a scam or after the occurrence of a scam. In other words, existing identifying technologies are typically incapable of identifying and warning users of potentially harmful websites that have not yet been determined to be phishing websites. In fact, most existing identifying technologies use no more than a precise matching between a website address and an already known phishing website address to determine whether the website is a phishing website. Furthermore, a website is typically identified only when its address is already included in the database containing the list of websites to be protected or the list of addresses of already known phishing websites.

BRIEF DESCRIPTION OF THE DRAWINGS

Various embodiments of the invention are disclosed in the following detailed description and the accompanying drawings.

DETAILED DESCRIPTION

Figure 1:
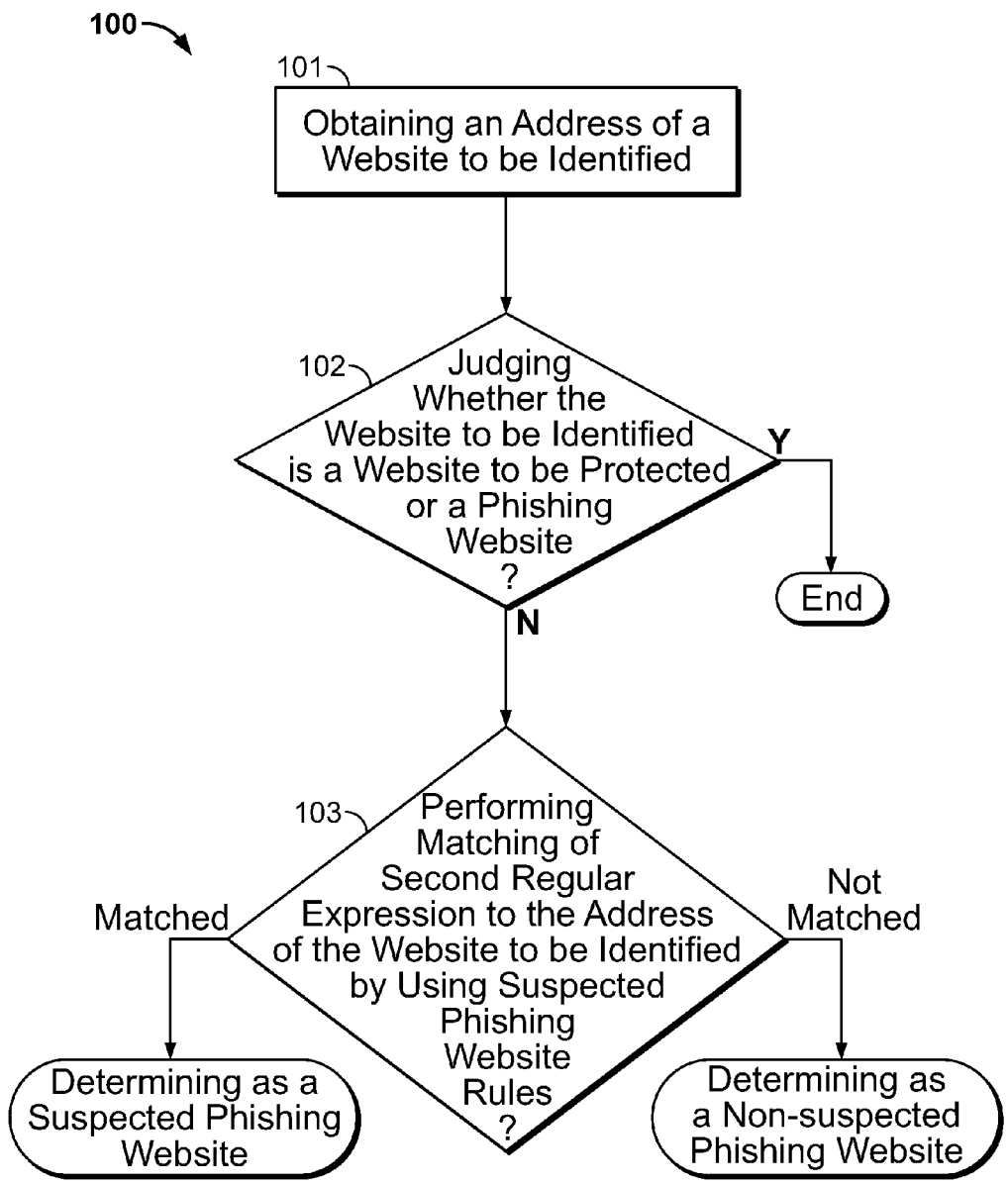
FIG. 1 is a flow chart illustrating an embodiment of a process for identifying suspected phishing websites.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some solutions according to the embodiments of the invention are described below in conjunction with the accompanying drawings. Obviously, the embodiments described herein comprise only some but not necessarily all embodiments of the invention. Some concepts in the application are described below first:

A uniform resource locator (URL), as an address of standard resource on Internet, is also called as an address of a website. The URL has been drafted as the Internet standard RFC1738 by World Wide Web Consortium. URL, as an identifying method, is used for fully describing the addresses of web pages and other resources on the Internet. Each web page on the Internet has a unique name identification generally referred to as a URL address, which may be a local hard disc, or a computer in a local area network, or more generally a website in the Internet. As used herein, URL is a Web address and is often called as a "website address".

As used herein, a "suspected phishing website" refers to a website that has a similar address to the addresses of already identified phishing websites but has not yet itself been determined to practice phishing or other deceptive conduct that harms users. For example, the website www.taopao.com cannot be labeled as an identified phishing website before it is determined that it has harmed the interests of www.taobao.com users. However, this website can still be determined as a suspected phishing website. Though it is not certain whether a suspected phishing website will actually harm the interests of its users, a warning of the website's potential to practice deceptive conduct can be made to its users before they interact with the website. Thus, the warning can reduce the probability of users visiting harmful websites.

FIG. 1 is a flow chart illustrating an embodiment of a process for identifying suspected phishing websites. Process 100 can be implemented on either the user terminal side or the network side. In some embodiments, process 100 may be implemented on system 300. As shown in FIG. 1, process 100 includes the following:

At 101, an address of a website to be identified is obtained.

The address of the website to be identified may be obtained in many ways, without any limitation thereto. For example, the address of the website may be obtained during chatting over instant messaging (IM) software. In another example, the address of the website may be obtained from the customized status message of a user. Examples of obtaining the address of the website are described in further detail below. However, regardless of the way the address of the website to be identified is obtained, the obtained address of the website can be used as the address of the website to be identified herein.

In some embodiments, the address of the website to be identified can be obtained via one or more application scenarios. For example, some particular application scenarios are described below.

In the field of instant messaging technology, the address of the website to be identified can be obtained by use of an instant messaging tool. Some examples of particular application scenarios are described in the following scenarios.

Scenario 1: when a user communicates by using an instant messaging tool (e.g. one-to-one chatting, chat rooms of multiple persons, chatting group, etc.), the user may obtain, when receiving an instant message, a URL address link from the contents of the received instant message.

Scenario 2: when a user clicks on a contact list of an instant messaging tool, a group member list or a contact list of any other form, the user may obtain a URL address link from the status message or signature message of a contact. For example, the status message or signature message of a contact may be a message customized by the contact and appears when the user waves a cursor over the name of the contact in the contact list.

Scenario 3: after a user has logged on an instant messaging platform, the user may obtain, when receiving an offline message (e.g. a message received when the user was not logged on), a URL address link from the contents of the received offline message.

Scenario 4: instant messaging software generally contains floating messages which are presented as windows floating from the bottom-right corner of a system task bar area. A user may obtain a URL address link from the contents of the floating window. For example, floating messages may include messages indicating a changed status of a member of the user's contact list (e.g. a contact logs on to the instant messaging software).

In the field of browser technology, the particular application scenarios include but are not limited to the following scenarios:

By clicking on any clickable elements in a webpage (e.g. a hyperlink associated with a picture, text, video or the like) a user may obtain a URL address link from the hyperlink associated with a clickable element.

In some embodiments, regardless of whether the method of process 100 is implemented at the user terminal side or the network side, the method of obtaining the address of the website to be identified may be as follows:

Any obtained character string and/or text containing URL information is filtered and matched against a preset first regular expression to obtain a URL in proper form from a matching result. In some embodiments, the first regular expression is a conventional format of a URL address and contains common feature(s) of a URL. For example, the format of "www.websitename.com" may be taken as the preset first regular expression against which a filtered character string is matched. The proper URL obtained by the filtering and matching is the address of the website to be identified. The website to be identified may be obtained by matching any character string and/or text containing URL information using the preset first regular expression, regardless of the particular scenario.

However, in some embodiments, in the field of the browser technologies, a clickable element (e.g. a picture or text with an associated hyperlink) itself contains a proper URL address. Typically, the URL information from a clickable element is deemed to be in proper URL form. Therefore, matching using the preset first regular expression may not be needed when obtaining the address of a website to be identified in the field of browser technologies because the URL to which the element points may be obtained directly.

The regular expression used to obtain the URL in proper form from the obtained character string and/or text may be referred to as the first regular expression in the following description.

Returning to FIG. 1, at 102, determining, according to the address of the website to be identified, whether the website to be identified is a website to be protected or a known phishing website. If the result of the determination of 102 is 'yes', then the website to be identified is already identified as either a website to the protected or a phishing website and should be handled accordingly. Process 100 therefore ends. Otherwise, process 103 is performed.

In 102, in some embodiments, determining may include judging whether the address of the website to be identified is included in a database (such as a preset list) of websites to be protected. If the website is not included in the preset list of websites to be protected, then the website to be identified is not deemed to be a website to be protected. In some embodiments, determining may also include, judging whether the address of the website to be identified is included in a database (such as a preset list) of already identified phishing websites. If the website is not included in the present list of already identified phishing websites, then the website to be identified is not deemed to be a phishing website.

The above two judging processes can be executed in any order. In some embodiments, judging whether the address of the website to be identified is included in a preset list of websites to be protected may be performed first. In some embodiments, judging whether the address of the website to be identified is included in a preset list of phishing websites may be performed first.

In some embodiments, if the address of the website to be identified is included in the preset list of websites to be protected or the preset list of phishing websites, then the website to be identified can be determined as a website to be protected or a phishing website based on the result of the identification. If the website is determined to be either of these two natures, then process 100 ends.

At 103, one or more suspected phishing website rules are applied, including matching of a second regular expression to the address of the website to be identified. If the matching is successful, then the website to be identified is determined to be a suspected phishing website.

Hereinafter the regular expression used for determining suspected phishing website is called the second regular expression since in some embodiments a first regular expression is used to identify the address of the website. In some embodiments, the second regular expression is at least one variation of a website address of a non-phishing website or a website to be protected. In some embodiments, the second regular expression is comprised of important keywords that appear in the website address of a non-phishing website or a website to be protected and also variants of those keywords. In some embodiments, suspected phishing website rules determine the combination of keywords and their variants that comprise the second regular expression.

In various embodiments, at the end of the 103 determination, the user may be prompted in one of the following manners:

1) the user may be prompted by graphics. In some embodiments, if the website to be identified is determined to be a website to be protected, a "√" may be displayed beside the address of the website on the prompt. But if the website to be identified is determined to be an identified phishing website, then a "x" may be presented beside the address of the website. And if the website to be identified is determined to be a suspected phishing website, then a "?" may be presented beside the address of the website.

2) the user may be prompted by text. In some embodiments, if the website to be identified is determined to be a website to be protected, then the user may be prompted that the URL link to the website is "Clickable", otherwise, the user may be prompted that the URL link to the website is "Unsafe" or "Possibly Unsafe".

The above illustration is based on an implementation of the method at the user terminal side to illustrate how to notify the user of the 103 determination result. The notifying method at the network side is similar to that of the user terminal side. The difference lies in that when the method is implemented at the network side, the determination result is first sent to the network side which then prompts the result to the user.

The matching of the second regular expression to the address of the website to be identified by using the suspected phishing website rules is further described below.

Figure 2:
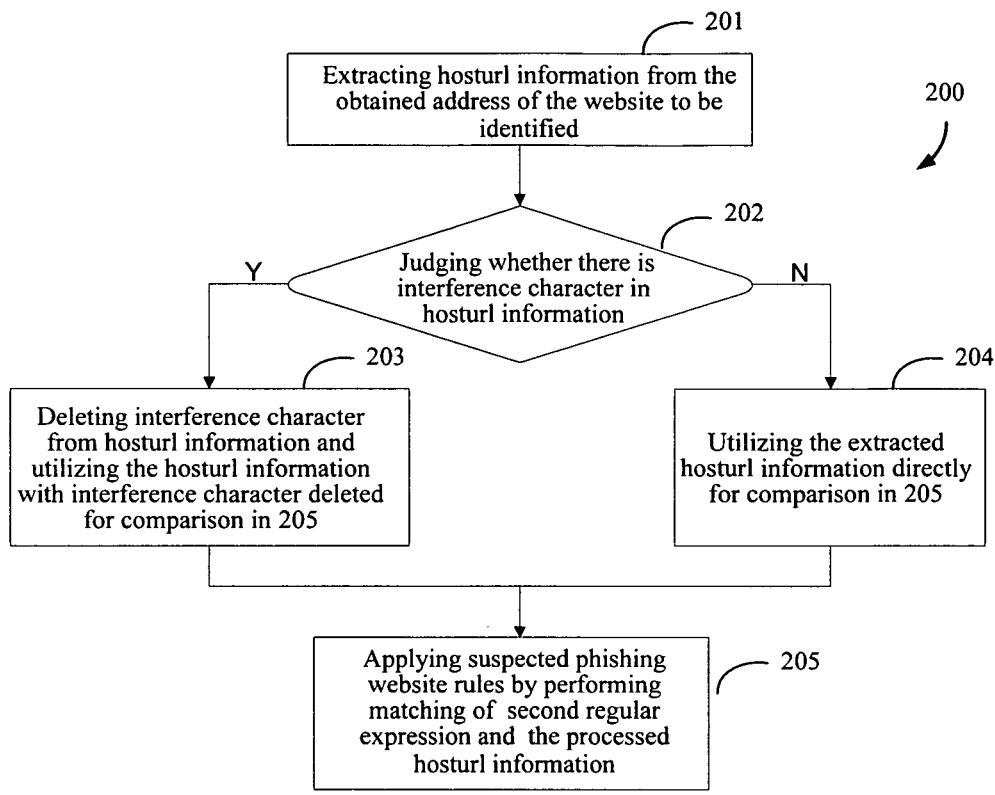
FIG. 2 is a flow chart illustrating an embodiment of process for applying suspected phishing website rule.

FIG. 2 is a flow chart illustrating an embodiment of process for applying suspected phishing website rule. In some embodiments, 103 is implemented with process 200.

At 201, the uniform resource locator information of a host (hosturl) is extracted from the obtained address of the website to be identified.

In some embodiments, assuming the obtained address of the website is "Protocol://hosturl/pathurl", the path information, the protocol prefix and the like in the address are ignored, and only the hosturl information is extracted.

At 202, it is determined whether there is any interference character in the hosturl information. If yes, 203 is performed; otherwise, 204 is performed.

In some embodiments, the interference character may be any interference information that is often used by phishing websites to imitate non-phishing websites. Examples of the interference character include various separator symbols such as an underscore "_", a hyphen "-", a space " ", and a comma ",", or the like. In some embodiments, the interference character may be one of the above mentioned symbols or any combination thereof.

At 203, it has already been determined in 202 that there is an interference character in the hosturl information and so the interference character is deleted. The processed hosturl information, with the interference character deleted, is used for the comparison in 205.

At 204, it has already been determined in 202 that there is no interference character in the hosturl information and so the extracted hosturl information is directly used for comparison in 205.

At 205, matching using the second regular expression is performed for the processed hosturl information according to the suspected phishing website rules.

In some embodiments, the suspected phishing website rules describe the important keyword(s) of a host name of a website to be protected and the commonly used variants thereof that should comprise a second regular expression. The keyword refers to a word or any combination of words in the hosturl information which may be used to represent the website. For example, "taobao", "alibaba", "yahoo", "ebay" or the like may be referred to as keywords for the websites of www.taobao.com, www.alibaba.com, www.yahoo.com, and www.ebay.com, respectively. The suspected phishing website rules are designed by manually determining the appropriate keywords to comprise a second regular expression for each of the websites included in the list of websites to be protected.

The above described commonly used variants may include but not limited to the following features:

1. Replacing characters with other, similar characters. For example, since the visual difference between the English letter "o" and the number "0" is often hard to spot when they are displayed on a computer, the address "taobao.com" may be modified to be "taoba0.com" by simply replacing the second alphabetical letter "o" with the numeral "0".

2. Omitting some consonant(s) that have little influence on the pronunciation in an English word. For example, the address "taobao.com" may be modified to be "taoba.com".

3. Adding separator symbol(s). For example, the address "taobao.com" may be modified to be "tao-bao.com".

Shown below is an example code of the second regular expression formed based on some suspected phishing website rules for the website addresses of non-phishing websites of Alibaba and its subsidiary companies such as Taobao, designed to match suspected phishing websites that are imitating the website addresses of such websites to be protected:

```
(?:
(?: a[1ll]i(?:(?:ba) | 8){1,2})     # matching "ali88", "a1iba8"
|
(?:ta[o0]?[bp]a[o0]?)     # matching "tapao", "tabao" or the like
```

```
|
(?:a[1l]i[bp]a[yi])         # matching "alipai" or the like
)
```

Since the processed hosturl information does not contain any interference character (e.g. as a result of deleting the interference character before the matching of regular expression), the second regular expression described by the suspected phishing website rules may leave the interference character out of consideration.

Process 200 may be performed at a user terminal or at the network side. In some embodiments, the user terminal may include an instant messaging tool or a mobile terminal.

Process 200 allows for identifying suspected phishing websites. Thus, a suspected phishing website can be identified and a warning given to a user before the user is harmed as a result of interacting with the potentially harmful website.

Figure 3:
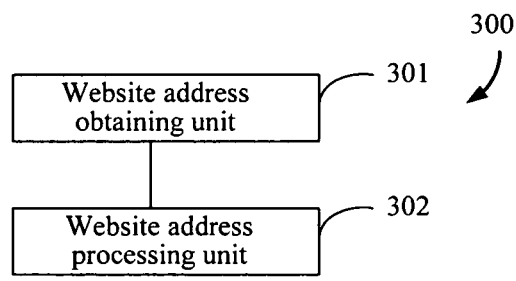
FIG. 3 is a schematic block diagram illustrating the structure of an embodiment of a system for identifying suspected phishing websites.

FIG. 3 shows an embodiment of a system for identifying suspected phishing websites. System 300 may include a website address obtaining unit 301 and a website address processing unit 302. The units and subunits that comprise system 300 may be implemented as software components executing on one or more processors, as hardware such as programmable logic devices and/or Application Specific Integrated Circuits designed to perform certain functions or a combination thereof. In some embodiments, the units and subunits can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units and subunits that comprise system 300 may be implemented on a single device or distributed across multiple devices.

The website address obtaining unit 301 is adapted to obtain an address of a website to be identified. The address of the website may be obtained in many ways. Regardless of the way address of the website is obtained, the obtained address can be used as the address of the website to be identified herein.

No limitation is defined herein to the way of obtaining the address of the website. In some embodiments, the address of the website may be obtained during the process of chatting over instant messaging (IM) software. In some embodiments, the address of the website may be obtained from the customized status message of a user. The address of the website obtained by any of the various means can be used as the address of the website to be identified herein. The particular application scenarios are the same as the above embodiments and are omitted herein.

The website address processing unit 302 is adapted to determine, according to the address of the website to be identified, that the website to be identified is neither a website to be protected nor a phishing website, perform a matching of a second regular expression to the address of the website to be identified by using suspected phishing website rules, and if the matching is successful, determine that the website to be identified is a suspected phishing website.

In some embodiments, system 300 may further include a prompting unit adapted to notify a result of a determination of a suspected phishing website to the user.

Figure 4:
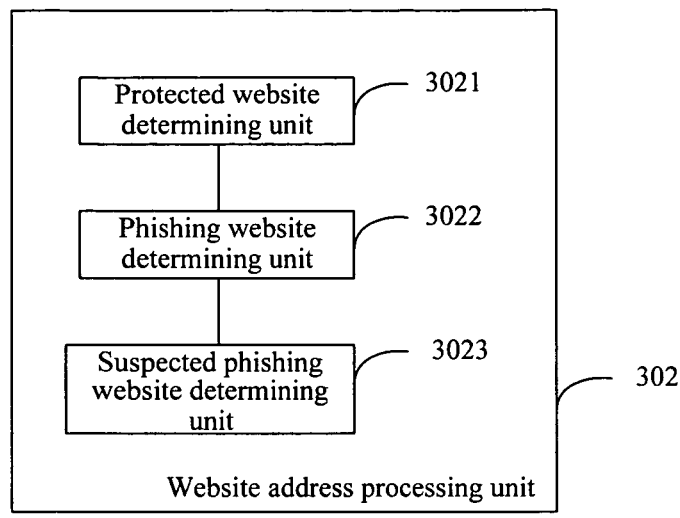
FIG. 4 is a schematic block diagram illustrating the structure of an embodiment of a website address processing unit.

FIG. 4 is a block diagram illustrating an embodiment of a website address processing unit. As shown in FIG. 4, the website address processing unit may include a protected website determining unit 3021, a phishing website determining unit 3022, and a suspected phishing website determining unit 3023.

Protected website determining unit 3021 is adapted to determine whether the address of the website to be identified is included in a preset list of websites to be protected, and therefore whether the website to be identified is a website to be protected.

Phishing website determining unit 3022 is adapted to determine whether the address of the website to be identified is included in a preset list of phishing websites, and therefore whether the website to be identified is a phishing website.

Suspected phishing website determining unit 3023 is adapted to match the second regular expression to the address of the website to be identified according to suspected phishing website rules, and determine whether the website to be identified is a suspected phishing website.

Figure 5:
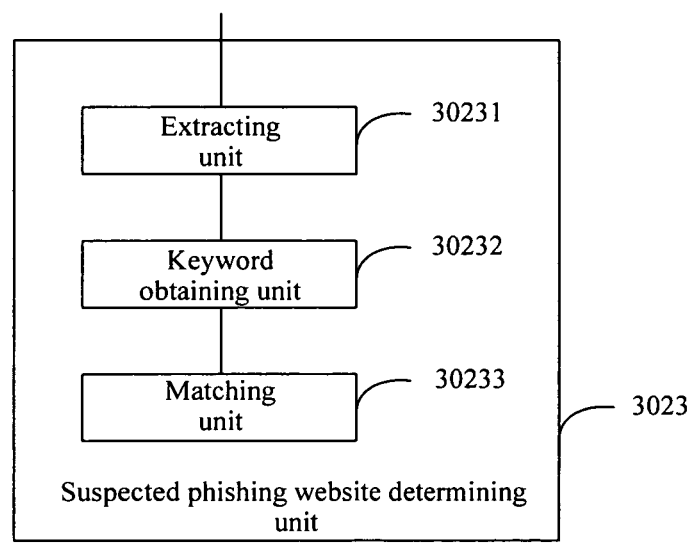
FIG. 5 is a schematic block diagram illustrating the structure of an embodiment of a suspected phishing website determining unit.

FIG. 5 is a block diagram illustrating an embodiment of the structure of the suspected phishing website determining unit. As shown in FIG. 5, the suspected phishing website determining unit may include an extracting unit 30231, a keyword obtaining unit 30232, and a matching unit 30233.

The extracting unit 30231 is adapted to extract uniform resource locator information of a host from the obtained address of the website to be identified. For example, the uniform resource locator information of a host is hosturl information, which may be extracted by deleting the path information, the protocol prefix, and the like from the obtained address of the website.

The keyword obtaining unit 30232 is adapted to utilize the extracted uniform resource locator information of the host as a processed uniform resource locator information to be compared when there is no interference character in the uniform resource locator information of the host and when there is an interference character, delete the interference character from the uniform resource locator information of the host and utilize the uniform resource locator information of the host, with the interference character deleted, as the processed uniform resource locator information to be compared.

In some embodiments, interference character may be any interference information that is often used by imitating websites, such as various separator symbols including an underscore "_", hyphen "-", a space " ", and a comma "," or the like. In some embodiments, the interference character may be one of the above mentioned symbols or any combination thereof.

The matching unit 30233 is adapted to determine, by matching the second regular expression to the processed uniform resource locator information to be compared according to suspected phishing website rules, whether the website to be identified is a suspected phishing website.

Figure 6:
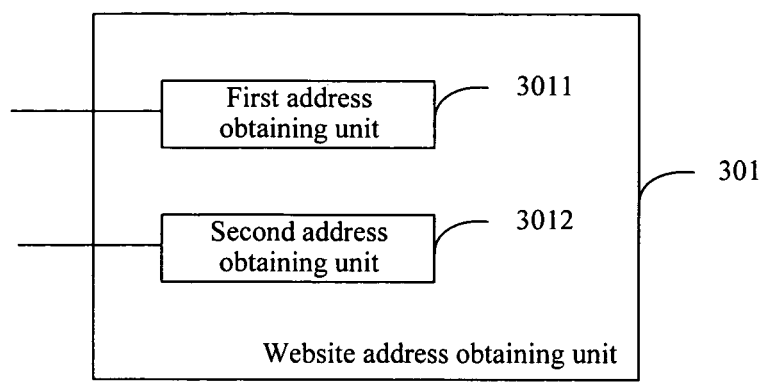
FIG. 6 is a schematic block diagram illustrating the structure of an embodiment of a website address obtaining unit.

FIG. 6 is a block diagram illustrating an embodiment of the structure of the website address obtaining unit. As shown in FIG. 6, the website address obtaining unit may include a first address obtaining unit 3011, and a second address obtaining unit 3012.

The first address obtaining unit 3011 is adapted to match, by using a preset first regular expression, any character string and/or text obtained by the apparatus according to common features of a URL, and obtain the address of the website to be identified in proper URL form from a result of the matching.

The second address obtaining unit 3012 is adapted to obtain, given the obtained character string and/or text URL information from the first address obtaining unit 3011, the address of the website to be identified directly from the character string and/or text.

The systems above are described to include a number of units, which in turn includes subunits. The units/subunits can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units/subunits may be implemented on a single device or distributed across multiple devices. The functions of the units may be merged into one another or further split into multiple subunits.

All or part of the steps in the above method embodiments can be implemented by a program instructing relevant hardware. The program may be stored in a computer readable storage medium, such as ROM/RAM, magnetic disc, optical disc, or the like.

The above particular embodiments are described as examples, which should not be regarded as limiting the invention thereto. Any modifications, equivalent alterations or improvements or the like that can be recognized without departing from the spirit and principle of the invention should be encompassed within the protection scope of the application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying suspected phishing websites, comprising:
    obtaining, using a processor, an address of a website to be identified;
    determining, according to the address of the website to be identified, that the website to be identified is neither a protected website nor a known phishing website;
    applying a suspected phishing website rule by matching a regular expression with the address of the website to be identified, wherein the regular expression describes one or more keywords of a website to be protected and variants of the one or more keywords, wherein applying the suspected phishing website rule includes:
        extracting a uniform resource locator information of a host from the address;
        determining whether there is at least one interference character in the uniform resource locator information of the host, wherein the at least one interface character comprises a symbol potentially associated with a phishing website;
        in the event that there is at least one interference character in the uniform resource locator information, modifying the uniform resource locator information by deleting the at least one interference character from the uniform resource locator information of the host and performing a comparison of the regular expression to the modified uniform resource locator information of the host; and
        in the event that there is no interference character in the uniform resource locator information, performing a comparison of the regular expression to the uniform resource locator information of the host; and in the event that the matching between the address of the website to be identified and the regular expression is successful, determining that the website to be identified is a suspected phishing website.

2. The method of claim 1, wherein the regular expression is a second regular expression, and obtaining the address of the website to be identified comprises:
    matching, by using a preset first regular expression, a character string based on a feature of Uniform resource locator (URL); and
    obtaining the address of the website to be identified based on a result of the matching.

3. The method of claim 1, wherein obtaining the address of the website to be identified directly from the character string and/or text if the obtained character string and/or text contains Uniform resource locator (URL) information.

4. The method of claim 1, wherein the interference character comprises one or more of an underscore, a hyphen, a space, or a comma.

5. The method of claim 1, wherein determining, according to the address of the website to be identified, that the website to be identified is neither a protected website nor a known phishing website comprises:
    determining whether the address of the website to be identified is included in a database of protected websites; and
    determining whether the address of the website to be identified is included in a database of known phishing websites.

6. The method of claim 1, further comprising notifying a user that the website to be identified is a suspected phishing website.

7. A system for identifying suspected phishing websites, comprising:
    one or more processors configured to:
        obtain an address of a website to be identified;
        determine, according to the address of the website to be identified, that the website to be identified is neither a protected website nor a known phishing website;
        apply a suspected phishing website rule by matching a regular expression with the address of the website to be identified, wherein the regular expression describes one or more keywords of a website to be protected and variants of the one or more keywords, wherein applying the suspected phishing website rule includes:
            extract a uniform resource locator information of a host from the address; determine whether there is at least one interference character in the uniform resource locator information of the host, wherein the at least one interface character comprises a symbol potentially associated with a phishing website;
            in the event that there is at least one interference character in the uniform resource locator information, modify the uniform resource locator information by deleting the at least one interference character from the uniform resource locator information of the host and performing a comparison of the regular expression to the modified uniform resource locator information of the host; and
            in the event that there is no interference character in the uniform resource locator information, perform a comparison of the regular expression to the uniform resource locator information of the host; and
        in the event that the matching between the address of the website to be identified and the regular expression is successful, determine that the website to be identified is a suspected phishing website; and one or more memories coupled to the one or more processors, to provide the one or more processors with instructions.

8. The system of claim 7, wherein the regular expression is a second regular expression, and obtaining the address of the website to be identified comprises:

matching, by using a preset first regular expression, a character string based on a feature of Uniform resource locator (URL); and obtaining the address of the website to be identified based on a result of the matching.

9. The system of claim 7, wherein obtaining the address of the website to be identified directly from the character string and/or text if the obtained character string and/or text contains Uniform resource locator (URL) information.

10. The system of claim 7, wherein the interference character comprises one or more of an underscore, a hyphen, a space, or a comma.

11. The system of claim 7, wherein determining, according to the address of the website to be identified, that the website to be identified is neither a protected website nor a known phishing website comprises:

determining whether the address of the website to be identified is included in a database of protected websites; and determining whether the address of the website to be identified is included in a database of known phishing websites.

12. The system of claim 7, wherein the one or more processors are further configured to notify a user that the website to be identified is a suspected phishing website.

13. A computer program product for identifying suspected phishing websites, the computer program product being embodied in a non-transitory computer readable storage medium and comprising computer instructions for:

obtaining an address of a website to be identified;

determining, according to the address of the website to be identified, that the website to be identified is neither a protected website nor a known phishing website;

applying a suspected phishing website rule by matching a regular expression with the address of the website to be identified, wherein the regular expression describes one or more keywords of a website to be protected and variants of the one or more keywords, wherein applying the suspected phishing website rule includes:

extracting a uniform resource locator information of a host from the address;

determining whether there is at least one interference character in the uniform resource locator information of the host, wherein the at least one interface character comprises a symbol potentially associated with a phishing website;

in the event that there is at least one interference character in the uniform resource locator information, modifying the uniform resource locator information by deleting the at least one interference character from the uniform resource locator information of the host and performing a comparison of the regular expression to the modified uniform resource locator information of the host; and in the event that there is no interference character in the uniform resource locator information, performing a comparison of the regular expression to the uniform resource locator information of the host; and in the event that the matching between the address of the website to be identified and the regular expression is successful, determining that the website to be identified is a suspected phishing website.

* * * * *

UNITED STATES PATENT AND TRADEMARK OFFICE
CERTIFICATE OF CORRECTION

PATENT NO. : 8,621,616 B2
APPLICATION NO. : 12/661753
DATED : December 31, 2013
INVENTOR(S) : Zhang et al.

It is certified that error appears in the above-identified patent and that said Letters Patent is hereby corrected as shown below:

In The Claims

In column 9, line 51, claim 1, delete "interface" and insert -- interference --, therefor.

In column 10, line 49, claim 7, delete "interface" and insert -- interference --, therefor.

In column 12, line 15, claim 13, delete "interface" and insert -- interference --, therefor.

Signed and Sealed this
Second Day of August, 2016

Michelle K. Lee
*Director of the United States Patent and Trademark Office*